United States Patent [19]

Schramm et al.

[11] Patent Number: 5,768,307
[45] Date of Patent: Jun. 16, 1998

[54] COHERENT DEMODULATION WITH DECISION-DIRECTED CHANNEL ESTIMATION FOR DIGITAL COMMUNICATION

[75] Inventors: Peter Schramm, Erlangen; Johannes Huber, Langensendelbach, both of Germany

[73] Assignee: Telefonaktiebolaget LM Ericsson, Stockholm, Sweden

[21] Appl. No.: 713,547

[22] Filed: Sep. 13, 1996

[51] Int. Cl.$^6$ .................................................. H04B 15/00
[52] U.S. Cl. ................................. 375/208; 375/324
[58] Field of Search .......................... 370/209, 324, 370/335, 342, 343; 375/200, 205, 206, 208; 380/34; 455/52.1, 65

[56] References Cited

U.S. PATENT DOCUMENTS

| | | | |
|---|---|---|---|
| 5,031,193 | 7/1991 | Atkinson et al. | 375/200 |
| 5,151,919 | 9/1992 | Dent . | |
| 5,218,619 | 6/1993 | Dent . | |
| 5,237,586 | 8/1993 | Bottomley . | |
| 5,297,171 | 3/1994 | Koch | 375/200 |
| 5,305,349 | 4/1994 | Dent . | |
| 5,353,352 | 10/1994 | Dent et al. . | |
| 5,357,454 | 10/1994 | Dent . | |
| 5,442,661 | 8/1995 | Falconer . | |
| 5,499,272 | 3/1996 | Bottomley | 375/347 |
| 5,506,861 | 4/1996 | Bottomley | 375/200 |
| 5,550,809 | 8/1996 | Bottomley et al. . | |
| 5,572,552 | 11/1996 | Dent et al. | 375/343 |

FOREIGN PATENT DOCUMENTS

| | | |
|---|---|---|
| 641 091 | 3/1995 | European Pat. Off. . |
| WO95/30289 | 11/1995 | WIPO . |

OTHER PUBLICATIONS

T. Miyatani et al., "A Spread Spectrum Communication System without a Reference Signal for a Frequency-Selective Fading Channel." Electronics and Communications in Japan. Part 1 (Communications), vol. 78, No. 7, ISSN 8756-6621, pp. 90-96 (Jul. 1995).

S. Haykin, *Adaptive Filter Theory* 3rd ed., chapts. 5, 6 (1996).

J.G. Proakis, *Digital Communications* 2nd ed., pp. 702-753 (1989).

H. Taub et al., *Principles of Communication Systems*, pp. 222-227, 378-388 (1971).

P. Schramm, "Attractive Coded Modulation Schemes for the Uplink in CDMA Mobile Communication Systems," ITG-Fachtagung Mobile Kommunikation, No. 135, pp. 255-262 (Sep. 1995).

P. Schramm et al., "Coherent Demodulation for IS-95 Uplink," IEEE International Symposium on Spread Spectrum Techniques & Applications (ISSSTA), pp. 1-5 (1996).

M. Schwartz et al., *Communication Systems and Techniques*, pp. 416-489 (1966).

A. Viterbi et al., "Performance of Power-Controlled Wideband Terrestrial Digital Communication," IEEE Transactions on Communications, vol. 41, No. 4, pp. 559-569 (Apr. 1993).

A. Viterbi, *CDMA, Principles of Spread Spectrum Communication*, pp. 77-121 (1996).

*Primary Examiner*—Stephen Chin
*Assistant Examiner*—Jospeh Roundtree
*Attorney, Agent, or Firm*—Burns, Doane, Swecker & Mathis, L.L.P.

[57] ABSTRACT

Methods and apparatus for demodulating a received communication signal employing coherent demodulation and decision-directed channel estimation are disclosed that have a significant gain compared to a receiver employing noncoherent demodulation. This is particularly so for spread spectrum communication systems such as the uplink specified by the TIA/EIA/IS-95 mobile communication standard, in which an orthogonal modulation scheme combined with convolutional coding and interleaving is used. The coherent demodulation methods and apparatus do not require a pilot signal, and thus can be used in communication systems that are originally designed for use of noncoherent demodulation.

28 Claims, 9 Drawing Sheets

Fig. 11
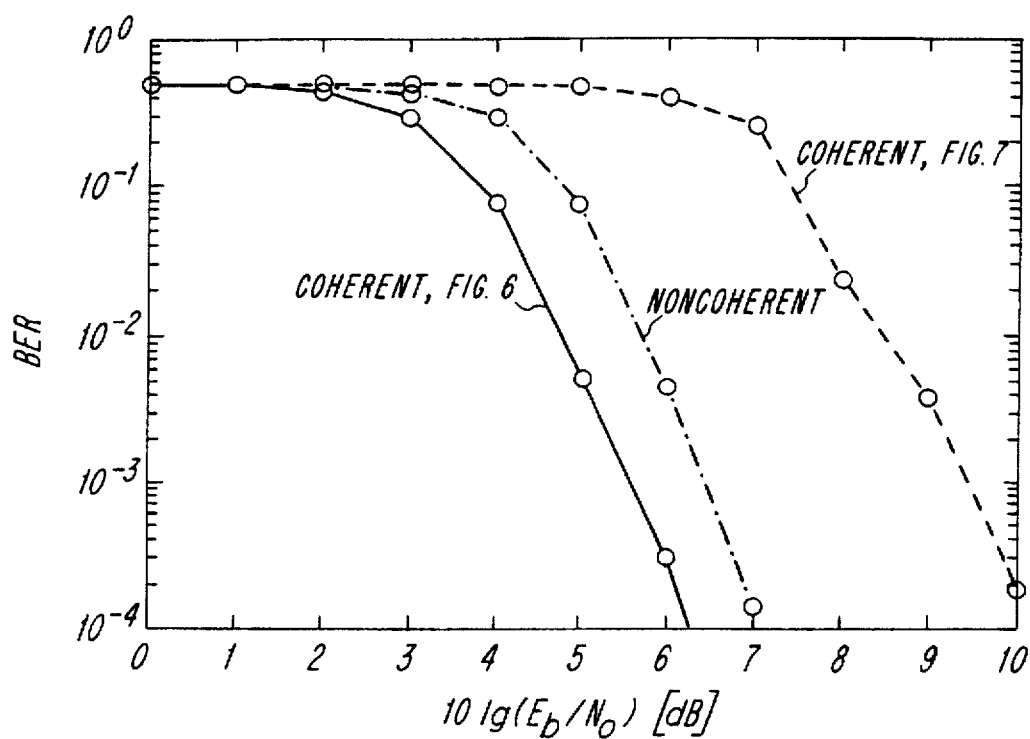
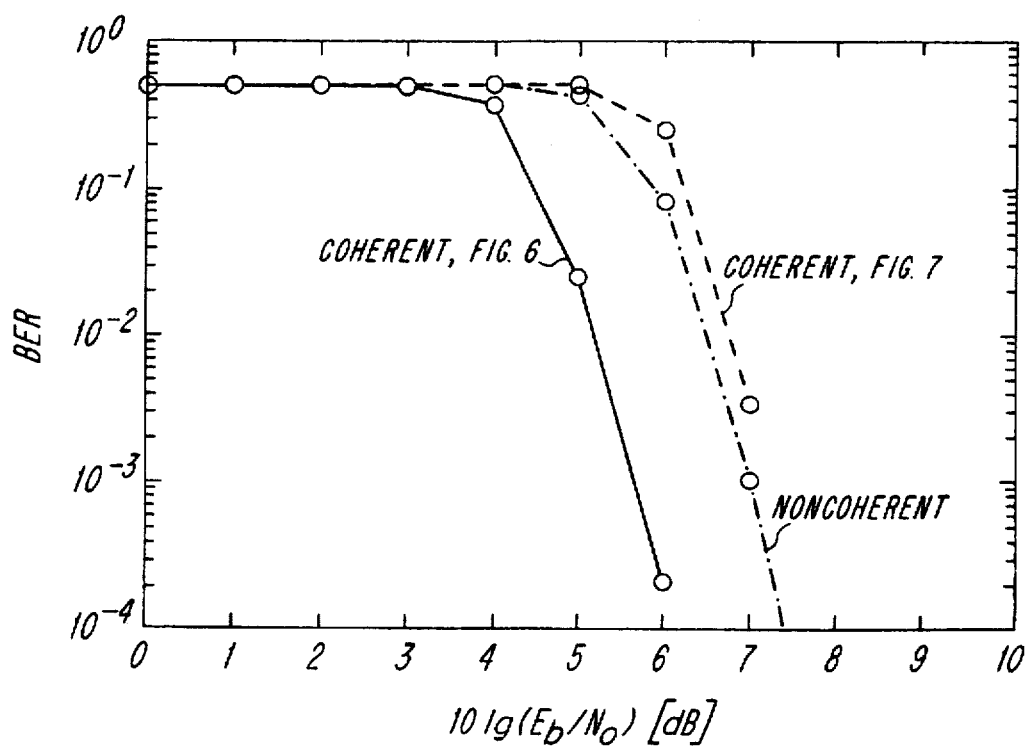
Fig. 12

COHERENT DEMODULATION WITH DECISION-DIRECTED CHANNEL ESTIMATION FOR DIGITAL COMMUNICATION

BACKGROUND

This invention relates to digital communication systems, such as code division multiple access systems and other spread spectrum systems.

Spread spectrum (SS) is a communication scheme that is advantageous for several applications. In the past, spread spectrum was used in military applications because of its resistance against jamming. More recently, spread spectrum has formed the basis of code-division multiple access (CDMA) communication systems, some of which have been applied in cellular radio telephone environments due to an advantageous resistance to fading.

In a typical CDMA system, an information datastream to be transmitted is impressed upon a much higher bit rate datastream generated by a pseudorandom code generator. The information datastream and the higher bit rate datastream are typically multiplied together, and such combination of the higher bit rate signal with the lower bit rate signal is called direct-sequence spreading the information signal. Each information datastream or channel is allocated a unique spreading code. A plurality of SS signals are transmitted on radio frequency carrier waves and jointly received as a composite signal at a receiver. Each of the SS signals overlaps all of the other SS signals, as well as noise-related signals, in both frequency and time. By correlating the composite signal with one of the unique spreading codes, the corresponding information signal is isolated and despread.

CDMA demodulation techniques are described in U.S. Pat. No. 5,151,919 and No. 5,218,619 to Dent for "CDMA Subtractive Demodulation"; U.S. Pat. No. 5,353,352 to Dent et al. for "Multiple Access Coding for Mobile Radio Communications"; and U.S. Pat. No. 5,550,809 to Bottomley et al. for "Multiple Access Coding Using Bent Sequences for Mobile Radio Communications".

The CDMA communication system specified by the TIA/EIA/IS-95 standard promulgated by the Telecommunications Industry Association and the Electronic Industries Association uses direct-sequence spreading. The IS-95 standard specifies conventional CDMA, in which each user demodulates its received signal without considering other users' signals, in a cellular mobile telephone system, although such a scheme can also be used for a fixed application like a local loop. It is known that the spectral efficiency of such a system is determined by the power efficiency of the underlying SS transmission scheme, as described for example in A. Viterbi, *CDMA* (1995). Therefore, it is advantageous to use a SS transmission scheme having a high power efficiency.

Point-to-multi-point communication in the downlink (i.e., from a base station to mobile stations) of systems like IS-95 suggests the use of a downlink pilot channel.

Coherent two-phase, or binary, phase-shift keying (BPSK) is the most suitable modulation scheme because of its high power efficiency at high bit error rates (BERs). In order to make coherent demodulation possible, however, the weight function or impulse response of the radio channel must be estimated in the receiver. For coherent digital amplitude modulation and transmission through a fading channel, such channel-response estimation requires a redundant pilot signal, which is usually acceptable in the downlink.

In order to avoid transmission of such a pilot signal in the uplink (i.e., from a mobile station to a base station), a noncoherent modulation like differential PSK (DPSK) might be used, but DPSK has a significantly lower power efficiency than coherent BPSK. Performance comparisons of BPSK and DPSK are available in the literature, including H. Taub et al., *Principles of Communication Systems*, pp. 222–227, 378–388 (1971).

An alternative to a noncoherent modulation like DPSK in the uplink is orthogonal modulation, which yields a power efficiency that increases as the number of orthogonal levels increases. For this reason, IS-95 specifies 64-ary orthogonal modulation combined with binary convolutional coding and binary interleaving. A receiver using noncoherent demodulation for this orthogonal modulation scheme is described in A. Viterbi et al., "Performance of Power-Controlled Wideband Terrestrial Digital Communication", *IEEE Transactions on Communications* vol. COM-41, pp. 559–569 (April 1993).

For transmission through a time-invariant, non-dispersive channel with additive white Gaussian noise (AWGN), orthogonal modulation with noncoherent demodulation attains the theoretical channel capacity (at rate zero), if the number of levels is permitted to increase beyond all bounds. In this extreme case, which is described in J. Proakis, *Digital Communications* 2d ed. (1989), coherent and noncoherent demodulation yield the same power efficiency. This does not occur in practice, however. Especially for transmission through a channel suffering from multipath propagation, a digital communication system using coherent demodulation has significantly better power efficiency than a system using noncoherent demodulation due to the latter's combining loss. It will be recognized that this is true for SS communication systems as well as other digital communication systems, such as those employing time division multiple access (TDMA).

Multipath propagation, in which a radio signal takes many paths from a transmitter to a receiver, can be addressed in SS and other digital communication systems by using a rake receiver, which is described in *Digital Communications* cited above. Coherent rake receivers are described in U.S. Pat. No. 5,305,349 to Dent for "Quantized Coherent Rake Receiver" and U.S. Pat. No. 5,237,586 to Bottomley for "Rake Receiver with Selective Ray Combining", both of which are expressly incorporated here by reference. Another coherent rake receiver is described in U.S. Pat. No. 5,442,661 to Falconer for "Path Gain Estimation in a Receiver".

The mobile radio channel in an equivalent baseband representation can be modeled as a frequency-selective or multipath Rayleigh-fading channel having L distinct propagation paths characterized by respective delays and complex weights $g_\lambda(t)$, where $\lambda \in \{1, \ldots, L\}$. The signal energies from the several propagation paths are combined, or "raked together", by the rake receiver before decoding. To decode optimally the original transmitted symbols (bits), the received signal energies must be combined in an appropriate way, which in a coherent rake receiver, involves scaling and aligning the phases of the received signals before they are combined.

FIG. 1 illustrates a conventional CDMA rake receiver using coherent combining of the signals from different propagation paths, which are usually called "rays". A received radio signal is demodulated by, for example, mixing it with cosine and sine waveforms and filtering the signal in a radio frequency (RF) receiver 1, yielding in-phase (I) and quadrature (Q) chip samples. These chip samples are collected in a buffer memory that comprises two buffers 2a, 2b for the I, Q samples, respectively. A multiplexer 3 receives the buffered chip samples and sends ranges of I chip samples and corresponding ranges of Q chip samples to complex correlators 4a, 4b. Each range selected includes N chip samples corresponding to the N-chip sequence corresponding to one symbol (sent during a modulation interval). In this context, "demodulation" refers to the processes of mixing, filtering, and correlating.

It may be noted that a description of the various techniques for estimating the delays of the propagation paths has been omitted here since these are not necessary to understanding Applicants' invention.

As shown in FIG. 1, two different ranges of each of the I and Q samples, corresponding to two different signal rays i, j, are provided to the complex correlators 4a, 4b, which correlate their respective sets of signal samples against a known signature sequence, or spreading code. The complex correlators 4a, 4b produce respective complex correlation values that are provided to respective complex multipliers 5, which form the products of each correlation value and the respective complex path weight $g_\lambda(.)$. Only the real parts of the products typically are sent to an accumulator 6, which sums the weighted correlations for all the signal rays processed. The sum produced by the accumulator 6 is a decision variable that is sent to a slicer or decoder 7.

It will be recognized that when only one propagation path is important, the rake receiver is in effect a conventional digital receiver. This might be illustrated in FIG. 1 by having the multiplexer 3 select only one range of I samples and one corresponding range of Q samples. In a conventional (non-SS) receiver, these ranges would simply be combined after one of the ranges is phase-shifted by ninety degrees, and the result would be provided to the slicer or decoder.

In the rake receiver depicted in FIG. 1, the effect of the multiplication of the correlation values by the complex weights is to scale and align the phases of the correlation values to maximize the overall signal to noise and interference ratio. The pilot signal, if there is one, is usually used to determine the complex weights. Since at least the phase of each correlation value varies, e.g., due to relative motion between the transmitter and receiver, a device such as a phase-locked loop is sometimes used to track correlation variations in order to maintain the correct weight angle. U.S. Pat. No. 5,305,349 describes a running average of past correlation values and a trend-based process (Kalman filter) for predicting the changing path weights. U.S. Pat. No. 5,442,661 describes a scheme based on a maximum likelihood criterion and the average path weight and slope of path weight for each path for estimating the path weights.

Such systems can be simulated by a suitably programmed computer. It is usually assumed that the differences between the path delays are longer than the inverse of the signal bandwidth, and thus the path weights $g_\lambda(t)$ effective after despreading are approximately uncorrelated. The path weights $g_\lambda(t)$ are usually modeled as complex-valued, Gaussian random processes having zero mean and standard Jakes (classical) Doppler spectra. To simplify analysis, it may be assumed that all propagation paths provide the same average signal power. The maximum Doppler frequency may be assumed as $0.024/T_b$, where $T_b$ denotes the equivalent time per information symbol (bit). In a typical mobile radio communication scenario having a data rate of $1/T_b=9.6$ kilobits/second and a radio carrier frequency of one gigahertz (1 GHz), this maximum Doppler frequency corresponds to a vehicle speed of 250 kilometers/hour. A complex-valued, white Gaussian noise process n(t) having (two-sided) power spectral density $N_0$, which corresponds to a real-valued, white Gaussian noise process n(t) having (single-sided) power spectral density $N_0$, may be added to model thermal noise and interference from other users.

The uplink transmission scheme specified by IS-95 with noncoherent demodulation is described in the Viterbi et al. publication cited above and is illustrated in FIG. 2 as a baseband representation for an M-ary orthogonal modulation. In FIG. 2, binary information symbols q[κ] are convolutionally encoded with a code rate $R_c$ by a suitable convolutional encoder 10, and the encoded symbols are interleaved by an interleaver 12, which produces symbols $a[v] \in \{-1, +1\}$. These interleaved symbols are converted from serial to parallel format if necessary by a converter 14, and in each modulation interval $\mu$ (period $T_s$), ld(M) binary symbols a[v] are grouped together and used as a symbol index $m[\mu] \in \{1, \ldots, M\}$, which is fed into an M-ary orthogonal modulator 16. In an IS-95 system, the orthogonal modulator 16 uses Walsh sequences to generate a continuous-time transmitter output signal s(t) by offset four-phase PSK (O4PSK) modulation of a carrier signal with each chip of the selected Walsh sequence. Each chip, which is a binary digit of the high rate signal, may be additionally spread and multiplied by a user-specific pseudo-noise sequence.

The transmitter output signal s(t) propagates through the communication channel, which adds a noise term n(t). For M=64 as defined in IS-95 and the maximum Doppler frequency given above, the modulation period $T_s=T_b R_c ld(M)$ is significantly shorter than the inverse of the maximum Doppler frequency. Thus, the channel weight function is approximately constant during each modulation period.

In FIG. 2, the receiver input signal r(t) is demodulated by a noncoherent Rake receiver. For each propagation path (ray), an M-ary correlator 18 comprising a system of M correlators, one for each orthogonal waveform, generates an output set of correlation values $x_{i,\lambda}[\mu]$, where $i \in \{1, \ldots, M\}$, $\lambda \in \{1, \ldots, L\}$, and again $\mu$ is the index of the modulation interval. For convenience, it may be assumed that the number of correlators 18 in the Rake receiver is identical to the number of propagation paths L through the channel, although it will be understood that a smaller or even larger number of correlators could be used. (One or more of such a smaller number of correlators would generate plural output sets of correlation values for corresponding orthogonal waveforms taken one at a time in series.) For Walsh sequences, the M-ary correlator conveniently implements a fast Walsh transform (FWT). A suitable FWT processor is described in U.S. Pat. No. 5,357,454 to Dent for "Fast Walsh Transform Processor".

In the conventional noncoherent IS-95 receiver, the correlation values $x_{i,\lambda}[\mu]$ produced by the correlators 18 are combined by a square-law combining (SLC) device 20, which generates M decision variables for a succeeding data estimation procedure (i.e., ecision or channel decoding). Due to the noncoherent demodulation, the decision variables $y_i[\mu]$ for the M symbols are computed by the SLC 20 as follows:

$$y_i[\mu] = \sum_{\lambda=1}^{L} |x_{i,\lambda}[\mu]|^2 \quad \forall i = 1, \ldots, M$$

As described in the Viterbi et al. publication cited above, these decision variables may be used in a suboptimum metric computation for an eventual Viterbi decoding procedure in order to reduce implementation complexity. This suboptimum metric computation is carried out by a processor 22 that determines the maxima of the decision variables. Exclusively the maximum value, which is given by the following expression:

$$y[\mu] = y_{\hat{m}}[\mu] = \max_i y_i[\mu]$$

is used as soft-decision reliability information. The appropriate respective maximum value is assigned to each of the ld(M) hard-decided binary symbols â[.] corresponding to the selected orthogonal waveform (Walsh sequence) identified by the index $\hat{m}[\mu]$.

The contrast between the coherent operation of the rake receiver illustrated in FIG. 1 and the noncoherent operation of the M-ary correlators 18, SLC 20, and processor 22 illustrated in FIG. 2 may be better appreciated by referring to FIG. 3, which shows a noncoherent rake receiver in more detail. In the noncoherent receiver, the squared magnitudes of the correlation values are accumulated, which obviates the need to align their phases before accumulation and thus the noncoherent receiver has no need for complex path weights $g_\lambda(t)$. The main difference from the coherent receiver shown in FIG. 1 is that the set of complex multipliers 5 is replaced by an SLC processor 20-1 in the SLC 20.

In FIG. 3, streams of complex digital samples I, Q of a received signal are provided to the set of L M-ary correlators 18 that compute the values of correlations of the sequence of signal samples against shifts of the receiver's spreading code sequence that are generated by respective ones of a set of local code generators. A set of at least four M-ary correlators is implied in FIG. 3 (by the solid-line data paths). The squared magnitudes of the complex correlation values for the respective shifts of the spreading code are computed from the in-phase (real part) and quadrature (imaginary part) omponent samples by the SLC processor 20-1. Multiplicative weighting coefficients may be applied by a weight processor 20-2 to the squared magnitudes of the correlation values, and the weighted squared magnitudes respective to the L paths are accumulated by an adder 20-3. The sum produced by the adder 20-3 is provided to a decision device such as the processor 22 for identifying the transmitted symbol.

For a communication system employing block codes as spreading sequences, the set of correlators 18 might include a sufficient number to process simultaneously all block code sequences and their shifts, which would be produced by the local code generators. A set of an SLC 20-1, an optional weight processor 20-2, and an adder 20-3 would be provided for each different spreading code sequence (three sets are indicated in FIG. 3), and the outputs of the adders 20-3 might be provided to the processor 22.

Returning to FIG. 2, decision variables d[v], which are given by the following expression:

$$d[v] = \hat{a}[v]y[v/ld(M)]$$

and which correspond to the binary symbols a[v], are used for a subsequent data estimation procedure (i.e., decision or channel decoding) in the receiver. It will be understood that the notation $\lfloor . \rfloor$ denotes the operator for calculating the maximum integer that is less than or equal to the operand. The decision variables d[v], which may be converted from a parallel format to a serial format by a converter 24, are used for metric computation in a device 26. The metrics produced by the device 26 are de-interleaved by a de-interleaver 28, and the de-interleaved symbols are decoded by a device such as a Viterbi decoder 30, which produces a stream of received decoded information symbols $\hat{q}[\kappa]$.

The derivation of the log-likelihood ratio $\Lambda|v|$ as a function of the decision variable d[v] is presented in the Viterbi et al. publication cited above and is shown by the dashed lines in FIG. 4 for a Rayleigh-fading channel with L=1 to 6 propagation paths conveying equal average signal power for 64-ary modulation and signal power to noise power ratio of 10 dB. The metric is determined from the decision variables by the metric computation device 26 based on such characteristic log-likelihood ratio curves. It will be understood that the metrics fed into the decoder may be quantized.

Chapter 4.5 of the Viterbi text cited above describes an improved metric (dual maximum metric) that has a main advantage that the soft-decision reliability values for the various binary symbols corresponding to one orthogonal waveform (Walsh sequence) may be different. Nevertheless, computer simulations have shown that the gain using this dual maximum metric over the metric described in the preceding paragraph is only about 0.2 dB.

Another demodulation scheme for receivers compatible with the IS-95 standard is based on estimating the signal power received in each propagation path. In P. Schranmm. "Attractive Coded Modulation Schemes for the Uplink in CDMA Mobile Communication Systems", 2. *ITG-Fachtagung Mobile Kommunikation (ITG-Fachbericht* 135 pp. 255–262 (September 1995), it is shown that a receiver based on this method is only of marginal benefit compared to (completely) noncoherent demodulation as described in the Viterbi et al. publication cited above.

Since noncoherent demodulation leads to less power efficient transmission schemes than coherent demodulation, especially for transmission over multipath channels, it is desirable to use coherent demodulation but without requiring an additional and redundant pilot signal for estimating the channel path weights $g_\lambda(t)$. Such a channel estimation scheme should thus extract the necessary channel information from the information-bearing signal itself. This would also have the benefit of making such a coherent receiver compatible with systems originally designed for noncoherent demodulation, such as an uplink receiver in accordance with the IS-95 standard.

SUMMARY

In accordance with Applicants' invention, coherent demodulation receivers are provided that do not require a pilot signal and that use a decision-directed channel estimation scheme. Thus, Applicants' receivers can be used in digital communication systems originally designed for noncoherent demodulation.

In accordance with one aspect of Applicants' invention, there is provided an apparatus in a receiver employing coherent demodulation and decision-directed channel estimation for a communication system in which a transmitter sends an information signal to the receiver and the receiver generates samples of a received signal that are correlated against a predetermined code sequence to produce correlation samples. The apparatus comprises a device for estimating path weights based on correlation samples and a device for generating decision variables in the data demodulation procedure employed by the receiver for determining the information signal. The estimating device comprises a device for generating temporary symbol estimates based on correlation samples that is separate from the data demodulation procedure employed by the receiver, devices for selecting correlation samples based on temporary symbol estimates, and channel estimation devices for generating path weights based on selected correlation samples. The decision variables are generated by maximum-ratio combinations of correlation samples based on estimated path weights.

In addition, the temporary symbol estimate generating device may comprise a device for noncoherently demodulating received signal samples based on correlation samples and a device for forming hard decisions of noncoherently demodulated received signal samples as temporary symbol estimates. Alternatively, the temporary symbol estimate generating device may comprise a device for demodulating received signal samples, a device for decoding demodulated signal samples and forming estimates of the information signal, and a device for re-encoding estimates of the information signal and forming temporary symbol estimates based in re-encoded estimates. As another alternative, the temporary symbol estimate generating device generates weights for linear combinations of correlation samples, and the channel estimation device generates estimated path weights based on such linear combinations. As yet another alternative, the temporary symbol estimate generating device comprises a device for coherently demodulating the received signal and a device for forming hard decisions of the coherently demodulated received signal as temporary symbol estimates. The temporary symbol estimate generating device also may comprise a device for demodulating the received signal in at least two stages and a device for forming hard decisions of the demodulated received signal as temporary symbol estimates.

In another aspect of Applicants' invention, there is provided a method in a receiver employing coherent demodulation and decision-directed channel estimation for a communication system in which a transmitter sends an information signal to the receiver and the receiver generates samples of a received signal that are correlated against a predetermined code sequence to produce correlation samples. The method comprises the steps of estimating path weights based on correlation samples, and generating decision variables in the data demodulation procedure employed by the receiver for determining the information signal. The estimating step comprises the steps of generating temporary symbol estimates based on correlation samples separately from the data demodulation procedure employed by the receiver, selecting correlation samples based on temporary symbol estimates, and generating path weights based on selected correlation samples. The decision variables are generated by maximum-ratio combinations of correlation samples based on estimated path weights.

In another aspect of Applicants' invention, there is provided an apparatus in a receiver employing coherent demodulation and decision-directed channel estimation for a communication system in which a transmitter sends an information signal to the receiver and the receiver generates samples of a received signal after matched filtering. The apparatus comprises a device for estimating path weights based on received signal samples, and a device for generating decision variables in the data demodulation procedure employed by the receiver for determining the information signal. The estimating device comprises a device for generating temporary symbol estimates based on received signal samples that is separate from the data demodulation procedure employed by the receiver, devices for forming products of inverses of temporary symbol estimates and received signal samples, and channel estimation devices for generating path weights based on selected received signal samples. The decision variables are generated by maximum-ratio combinations of received signal samples based on estimated path weights.

In another aspect of Applicants' invention, there is provided a method in a receiver employing coherent demodulation and decision-directed channel estimation for a communication system in which a transmitter sends an information signal to the receiver and the receiver generates samples of a received signal after matched filtering. The method comprises the steps of estimating path weights based on received signal samples, and generating decision variables in the data demodulation procedure employed by the receiver for determining the information signal. The estimating step comprises the steps of generating temporary symbol estimates based on received signal samples separately from the data demodulation procedure employed by the receiver, forming products of inverses of temporary symbol estimates and received signal samples, and generating path weights based on selected received signal samples. The decision variables are generated by maximum-ratio combinations of received signal samples based on estimated path weights.

In another aspect of Applicants' invention, a receiver for a spread spectrum communication system, in which a transmitter sends an information signal to the receiver and the receiver generates samples of a received signal, comprises a device for producing samples of at least two rays of the received signal; a device for correlating groups of samples against a predetermined code sequence to produce a plurality of correlation samples; a device for estimating a respective path weight for each ray based on correlation samples; and a device for generating decision variables in the data demodulation procedure employed by the receiver for determining the information signal. The estimating device comprises a device for generating temporary symbol estimates based on correlation samples that is separate from the data demodulation procedure employed by the receiver, a device for selecting correlation samples based on temporary symbol estimates, and a channel estimation device for generating path weights based on selected correlation samples. The decision variables are generated by maximum-ratio combinations of correlation samples based on estimated path weights.

In addition, the temporary symbol estimate generating device may comprise a device for square-law combining correlation samples and a device for forming hard decision of square-law-combined correlation samples. The temporary symbol estimate generating device may further comprise delay elements for correlation samples.

In another aspect of Applicants' invention, a method of demodulating an information signal in a spread spectrum communication system, in which a receiver generates samples of a received information signal, comprises the steps of producing samples of at least two rays of the received information signal; correlating groups of the samples against a predetermined code sequence to produce a plurality of correlation samples; estimating a respective path weight for each ray based on correlation samples; and generating decision variables for determining the information signal. The estimating step comprises the steps of generating temporary symbol estimates based on correlation samples that is separate from the receiver's data demodulation procedure, selecting correlation samples based on temporary symbol estimates, and generating path weights by filtering selected temporary symbol estimates. The decision variables are generated by maximum-ratio combining correlation samples selected according to estimated path weights.

The step of generating temporary symbol estimates may comprise the steps of square-law combining correlation samples and forming hard decisions of square-law-combined correlation samples. The step of generating temporary symbol estimates may further comprise the step of delaying correlation samples.

BRIEF DESCRIPTION OF THE DRAWINGS

Applicants' invention will be understood by reading this description in conjunction with the drawings in which:

FIG. 11 is a plot of bit error rate with respect to signal power to noise power ratio for the two coherent demodulator implementations with decision-directed channel estimation illustrated in FIG. 6 and FIG. 7 when the communication channel has one propagation path;

FIG. 12 is a plot of bit error rate with respect to signal power to noise power ratio for the two coherent demodulator implementations with decision-directed channel estimation illustrated in FIG. 6 and FIG. 7 when the communication channel has four propagation paths.

DETAILED DESCRIPTION

The following description indicates that coherent demodulation is preferable to noncoherent demodulation for improving the performance of digital communication systems employing orthogonal modulation schemes. A receiver employing a combination of coherent demodulation and decision-directed (DD) channel estimation is described. Such a receiver improves the power efficiency of a SS communication system such as the uplink specified by the IS-95 standard, and since such a receiver structure can be used without a pilot signal, the receiver is fully compatible with the IS-95 standard.

Nevertheless, it will be understood that Applicants' invention is not limited to this environment and that a combination of coherent demodulation and DD channel estimation can be used for improving the power efficiency of many transmission schemes employing orthogonal modulations. For example, a receiver employing the combination of coherent demodulation and DD channel estimation can be used in a CDMA system employing joint demodulation or detection, or successive cancellation techniques such as those described in U.S. Pat. No. 5,151,919 and U.S. Pat. No. 5,218,619 cited above.

Figure 1:
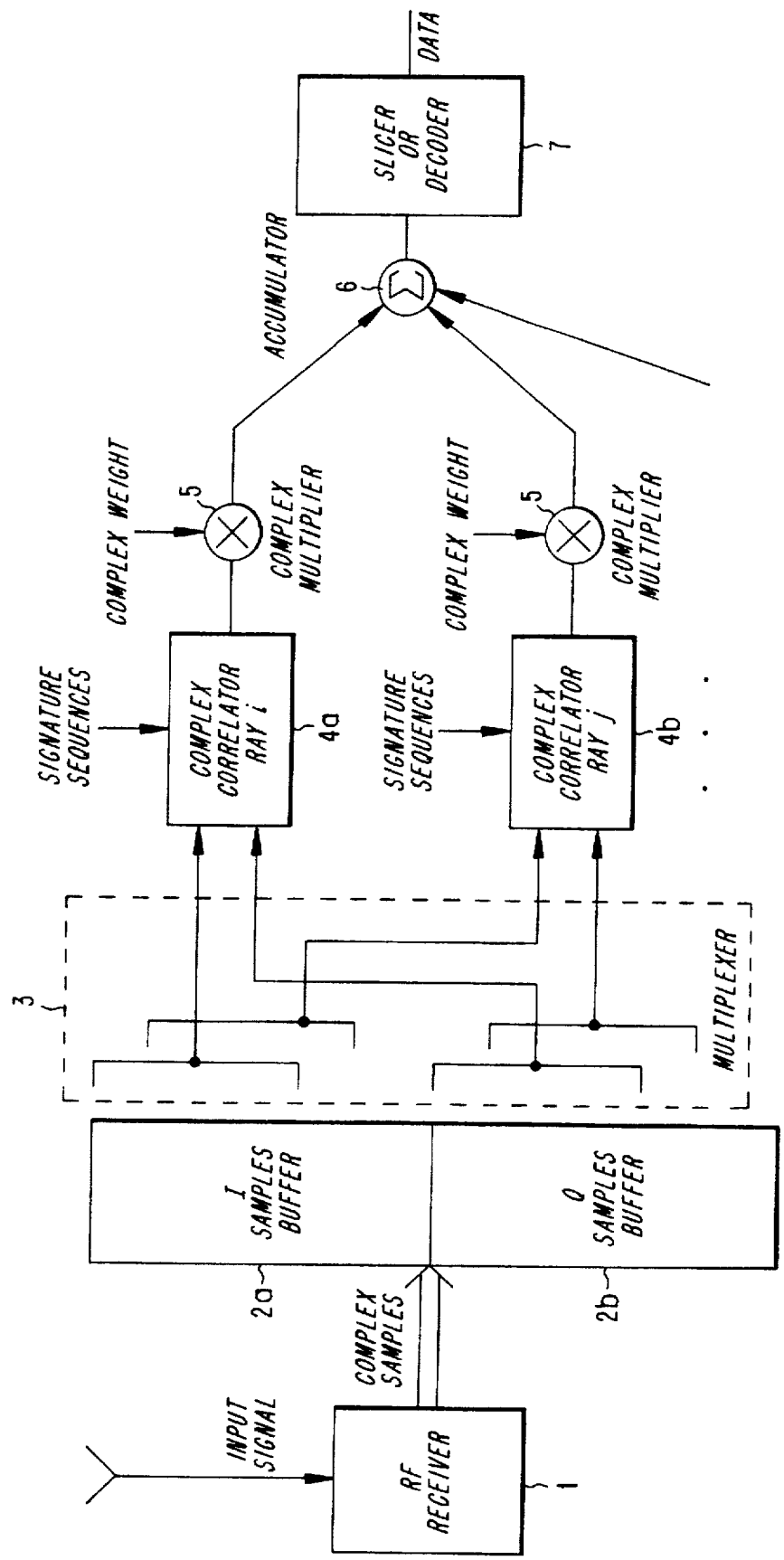
FIG. 1 is a block diagram of a conventional coherent rake receiver.
Figure 2:
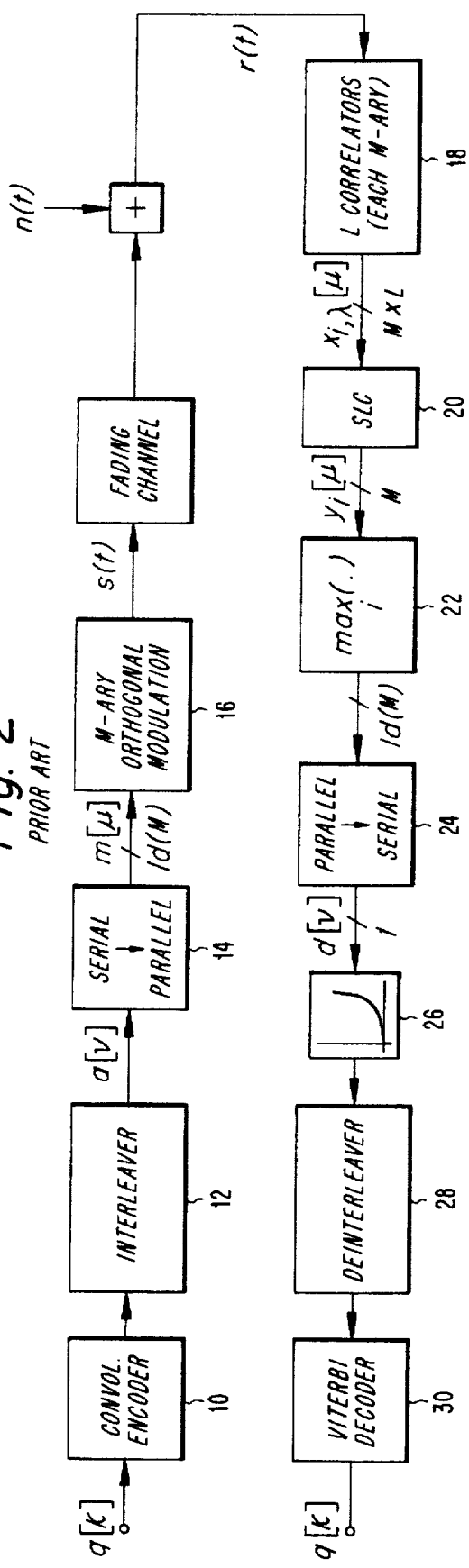
FIG. 2 is a block diagram of a spread spectrum communication system based on orthogonal modulation and noncoherent demodulation.
Figure 5:
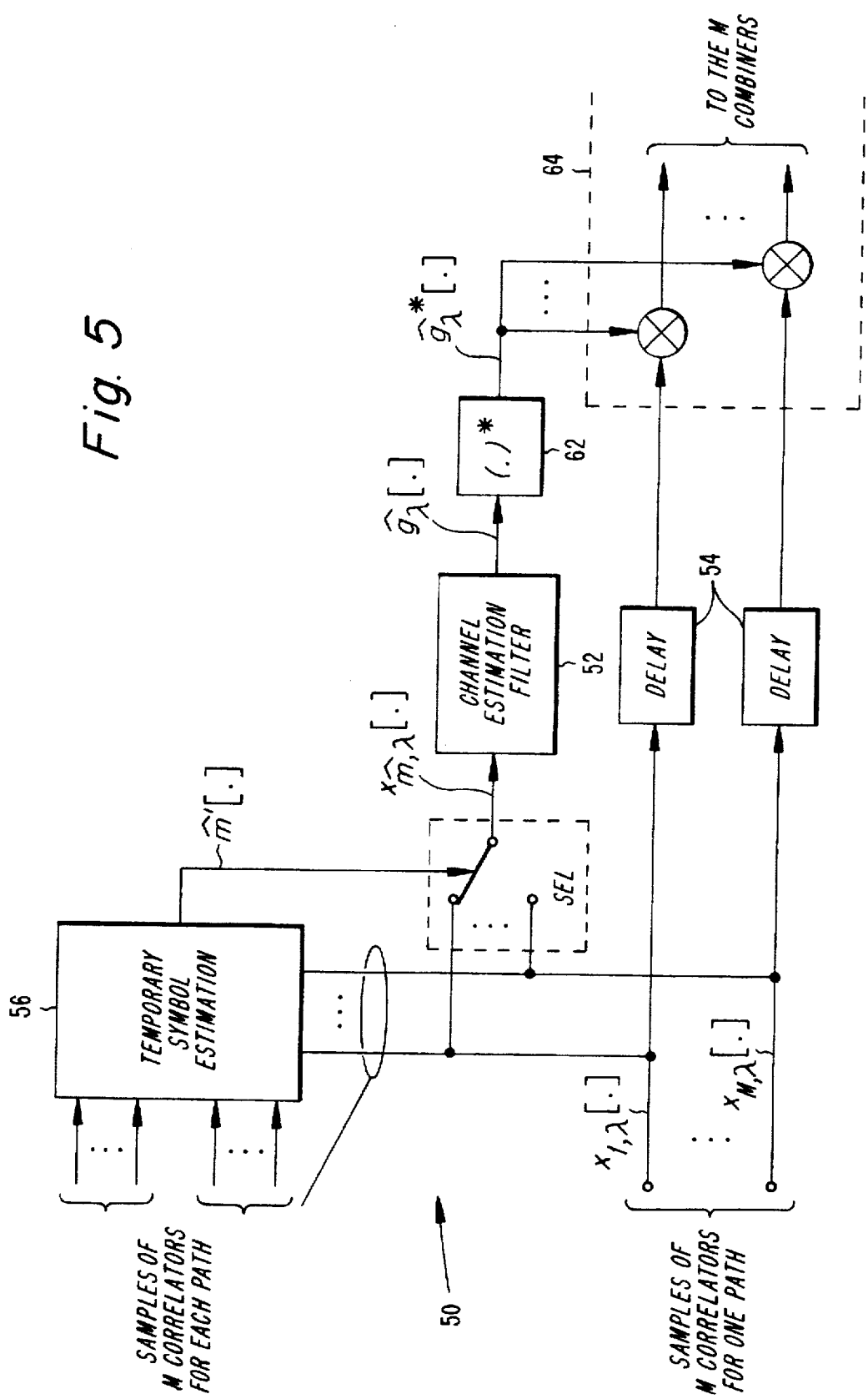
FIG. 5 is a block diagram of a portion of a coherent receiver with decision-directed channel estimation in accordance with Applicants' invention.
Figure 6:
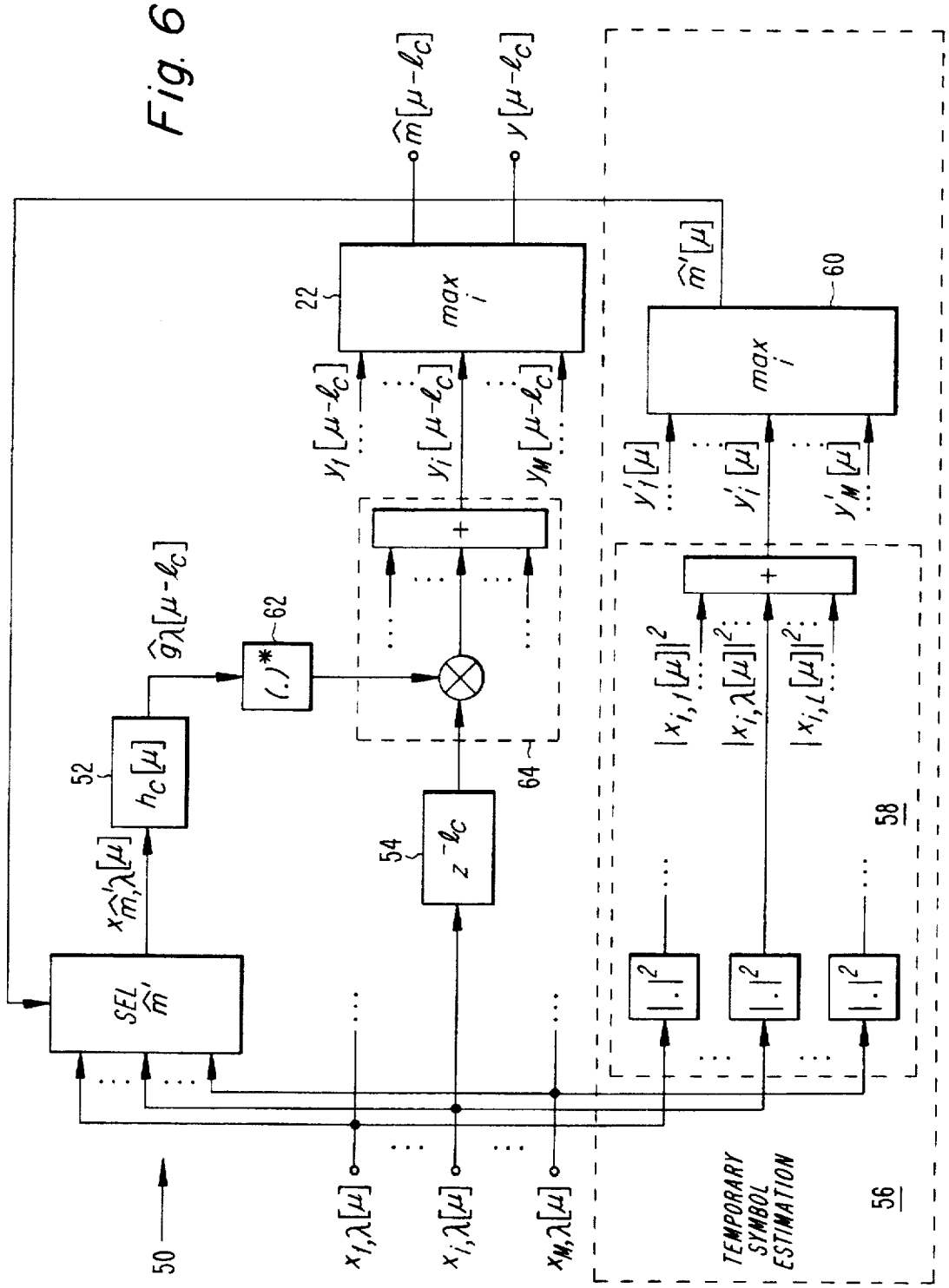
FIG. 6 is a representation of a portion of a coherent receiver with decision-directed channel estimation without feedback in accordance with Applicants' ninvention.
Figure 13:
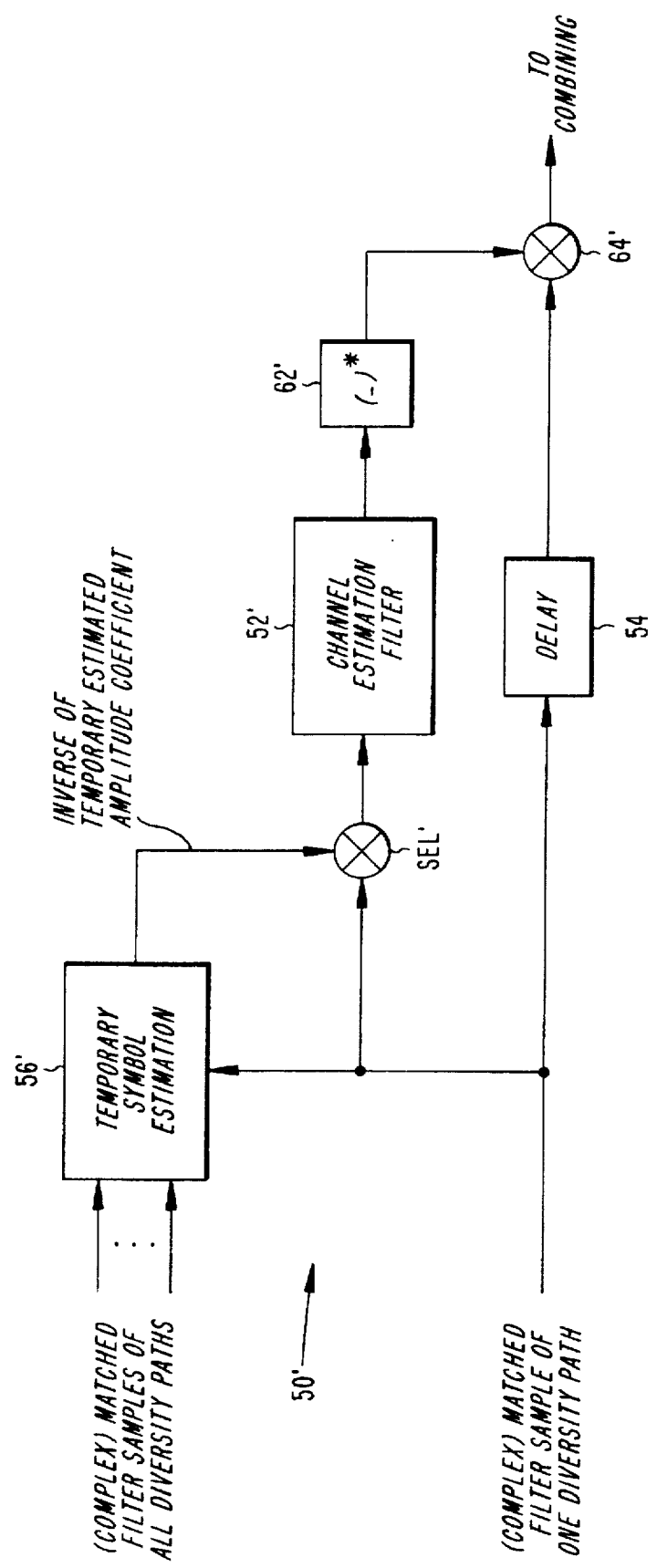
FIG. 13 is a block diagram of a portion of a non-spread-spectrum receiver in accordance with Applicants' invention.

The major part of a communication scheme using Applicants' coherent demodulation with DD channel estimation could be the same as the scheme illustrated by the baseband representation of FIG. 2. Like the noncoherent rake receiver depicted in FIGS. 2 and 3, Applicants' coherent rake receiver comprises several M-ary correlators in an arrangement similar to that depicted in FIG. 1. Nevertheless, instead of square-law combining as in the noncoherent receivers of FIGS. 2 and 3, a coherent receiver in accordance with the invention comprises means 50 for generating the M decision variables (for a subsequent data estimation procedure) by a maximum-ratio combining process that uses estimates of the path weights. Examples of this generating means 50 are depicted in FIGS. 5, 6, and 13, in which like components are identified by like reference numerals.

The estimated path weights $\hat{g}_\lambda[.]$ are generated by first generating indexes $\hat{m}'[.]$ of temporary symbol estimates by forming hard decisions of the correlation samples after the combining or by demodulating, decoding, and re-encoding the received signal. As indicated in FIG. 5 for example, the indexes $\hat{m}'[.]$ of the temporary symbol estimates and the selected correlation samples are generated based on the samples of all M-ary correlators corresponding to the propagation paths taken into account in the rake receiver.

In accordance with Applicants' invention, the means 50 generates temporary symbol estimates by a process that is separate from the data demodulation procedure itself and that can involve either coherent or noncoherent demodulation. If noncoherent demodulation is used for generating the temporary symbol estimates, channel estimation filters 52 may be implemented with delay, and this delay is taken into account in the maximum-ratio combining process by including delay elements 54 in the means 50 for generating the decision variables.

At each M-ary correlator output, the index $\hat{m}'[.]$ is used for selecting the corresponding sample from all M samples (see selector device SEL in FIGS. 5, 6, and 7), and that selected correlation sample $x_{\hat{m}'\lambda}[.]$ is fed into the channel estimation filter 52, which usually is a low-pass filter. The output of the channel estimation filter 52 is the estimated path weight $\hat{g}_\lambda[.]$ used in the maximum ratio combining process. This procedure is performed for all propagation paths processed by the rake receiver, and is explained in more rigorous detail below.

Figure 3:
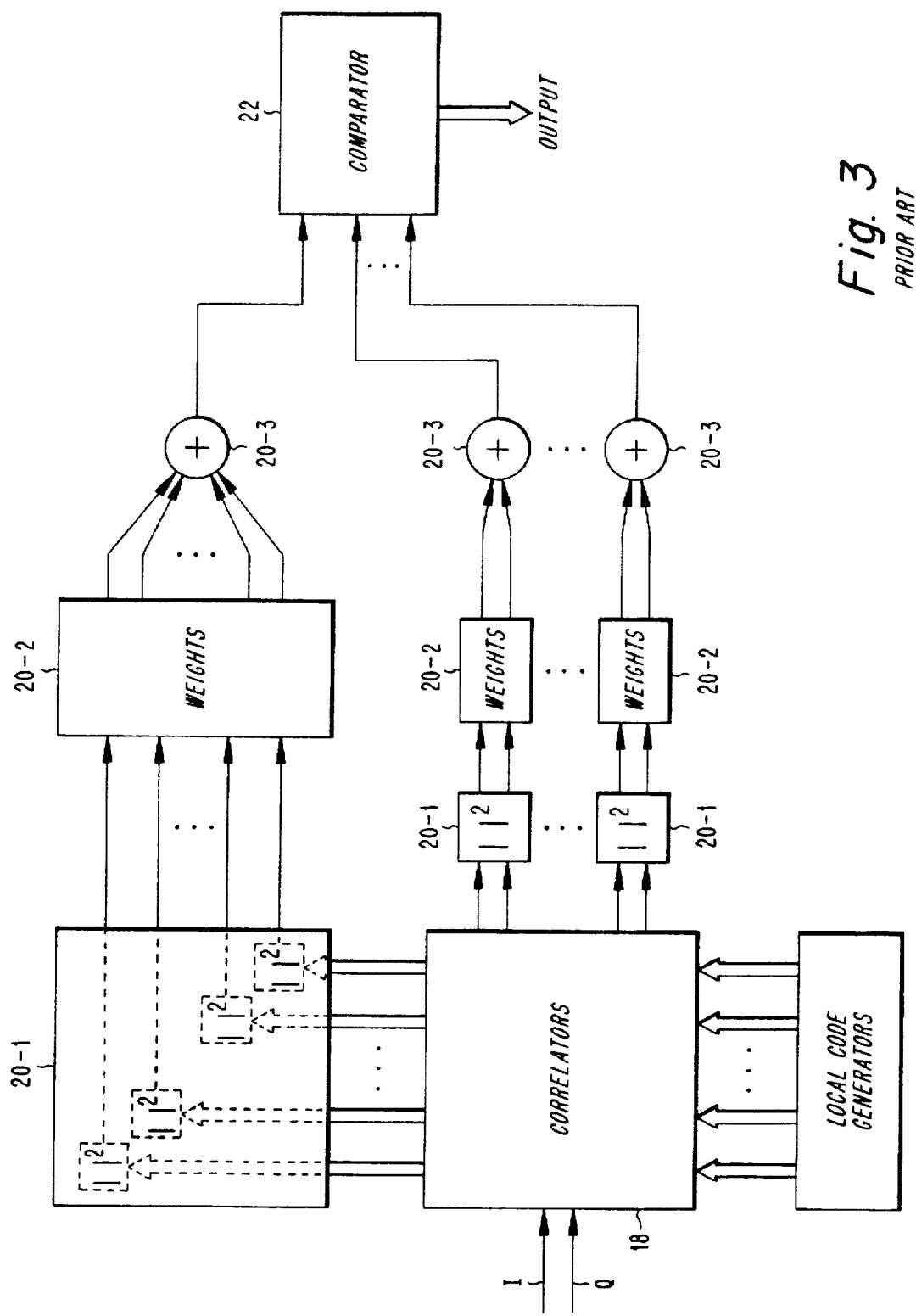
FIG. 3 is a block diagram of a portion of the noncoherent receiver of FIG. 2.

As in FIGS. 2 and 3, demodulation may be performed by a rake receiver that generates correlation samples $x_{i,\lambda}[.]$, where $i \in \{1, \ldots, M\}$ and $\lambda \in \{1, \ldots, L\}$. In accordance with one aspect of Applicants' invention, the decision variables $y_i[.]$ corresponding to each of the M symbols are determined by a process of maximum-ratio combining (MRC) according to the following expression:

$$y_i[\mu] = \sum_{\lambda=1}^{L} Re\{x_{i,\lambda}[\mu]\hat{g}_\lambda^*[\mu]\} \quad \forall i = 1, \ldots, M$$

where the complex weight of propagation path $\lambda$ in the modulation interval $\mu$ is denoted by $g_\lambda[\mu] = g_\lambda(\mu T_s)$ and where

* denotes conjugation. Correspondingly, $\hat{g}_\lambda[\mu]$ denotes an estimate of this path weight. The preceding expression will be recognized as a coherent summation of the correlation values $x_{i,\lambda}[\mu]$, and each summation on $\lambda$ is equivalent to the process carried out by a respective one of the adders 20-3 shown in FIG. 3.

Figure 4:
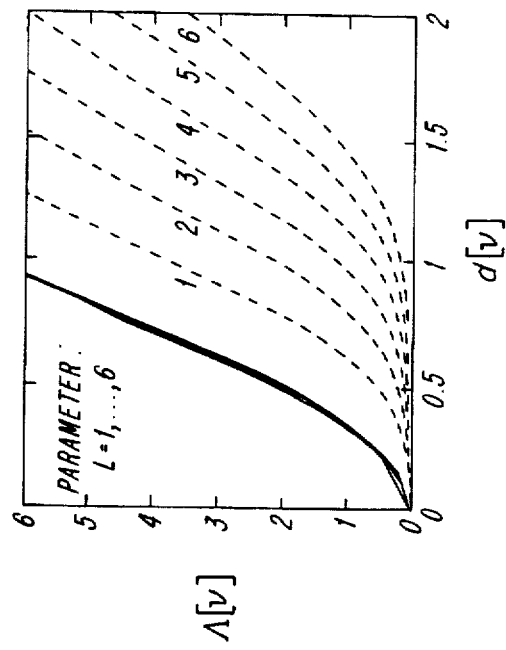
FIG. 4 is a plot of the log-likelihood ratios used for metric computation for the communication system of FIG. 2 and for a communication system in accordance with Applicants' invention.

The remainder of the process of generating and decoding the decision variables $y_i[.]$ is the same as that described above in connection with FIGS. 2 and 4. It is necessary only to adapt the log-likelihood ratio $\Lambda[\mu]$, which is given by the following expression:

$$\Lambda[\mu] = \ln\left(\frac{p_{y|a}(y|\mu||a|v]=+1)}{p_{y|a}(y|\mu||a|v]=-1)}\right)$$

to Applicants' modified demodulation scheme. Here $p_{y|a}$ (yla) is the probability density function (pdf) of the maximum decision variable $y[\mu]$ for given binary symbol $a[v]$ with $\mu=\lfloor v/\text{ld}(M)\rfloor$. Since an analytical solution is difficult to derive, the log-likelihood ratio can be estimated by measuring the pdfs. The results for various numbers of propagation paths are indicated by the solid lines in FIG. 4, which shows that the computation of the metric in a Viterbi decoder that might be included in Applicants' receiver is insensitive to the number of propagation paths. This is in marked contrast to the behavior of the conventional receiver using noncoherent demodulation (see the dashed lines in FIG. 4).

As described above, a channel estimation procedure that extracts the necessary information on the path weights exclusively from the information-bearing signal is needed if a pilot signal is to be avoided. Such a procedure is described below that is implemented by an estimation unit 56, selectors SEL, and the channel estimation filters 52. In a rake receiver as shown in FIGS. 5 and 6, for example, Applicants' means 50 for generating decision variables comprises a temporary symbol estimation unit 56; L selectors SEL, one for each propagation path $\lambda$; L channel estimation filters 52, one for each propagation path $\lambda$; L conjugators 62, one for each propagation path $\lambda$; M maximum-ratio combiners 64, each comprising L multipliers and an adder, for combining L outputs from L conjugators 62; and a metric processor 22.

The estimation unit 56 generates indexes $\hat{m}'[\mu] \in \{1, \ldots, M\}$ of temporary symbol estimates that are used for selecting corresponding correlation samples $x_{\hat{m}',\lambda}[\mu]$ for each propagation path $\lambda=1, \ldots, L$. It will be appreciated that in the embodiment illustrated in FIG. 5, the indexes $\hat{m}[.]$ are identical to the temporary symbol estimates. (In another embodiment described in more detail below, the estimation unit 56 generates weights for a linear combination of correlation samples.) If a temporary symbol estimate is correct, i.e., if $\hat{m}'[\mu]=m[\mu]$, the selected signal is given by the following expression:

$$x_{\hat{m}',\lambda}[\mu]=x_{m,\lambda}[\mu]=g_\lambda[\mu]+n_{m,\lambda}[\mu]$$

in which the $n_{m,\lambda}[.]$ represent the noise at the output of the correlators and are complex-valued, white, Gaussian processes with zero mean, which usually are approximately independent with respect to the symbol index $m \in \{1, \ldots, M\}$ and the path index $\lambda \in \{1, \ldots, L\}$. The estimated path weight $\hat{g}_\lambda[.]$ is generated by feeding the correlation samples $x_{\hat{m}',\lambda}[.]$ selected according to the temporary symbol estimates by the estimation unit 56 and selector SEL for each path into an channel estimation filter 52 having a cutoff frequency that is approximately equal to the maximum Doppler frequency.

In principle, there are two different ways to generate the temporary symbol estimates that are produced by the estimation unit 56. One way is to generate the temporary symbol estimates through forming hard decisions of the combined correlation samples as mentioned above. The other way to generate the temporary symbol estimates is through demodulation, decoding, and re-encoding. Then, channel coding is used for improving the reliability of the temporary symbol estimates, too. As a first step, demodulation is performed using a conventional noncoherent rake receiver. This receiver's output samples (decision variables) are de-interleaved, if necessary, and fed into a channel decoder in order to estimate the information signal. In contrast to the conventional receiver, these information signal estimates are not the final result but are re-encoded and interleaved again, with the result being used as temporary symbol estimates that are used for selecting the correlation samples fed into a channel estimation filter 52 as described above. Because of the large delay, introduced especially by the time-consuming steps of de-interleaving and re-interleaving the symbols (see FIG. 2), this method is currently believed to be difficult to implement in a practical communication system for time-varying channels.

Figure 7:
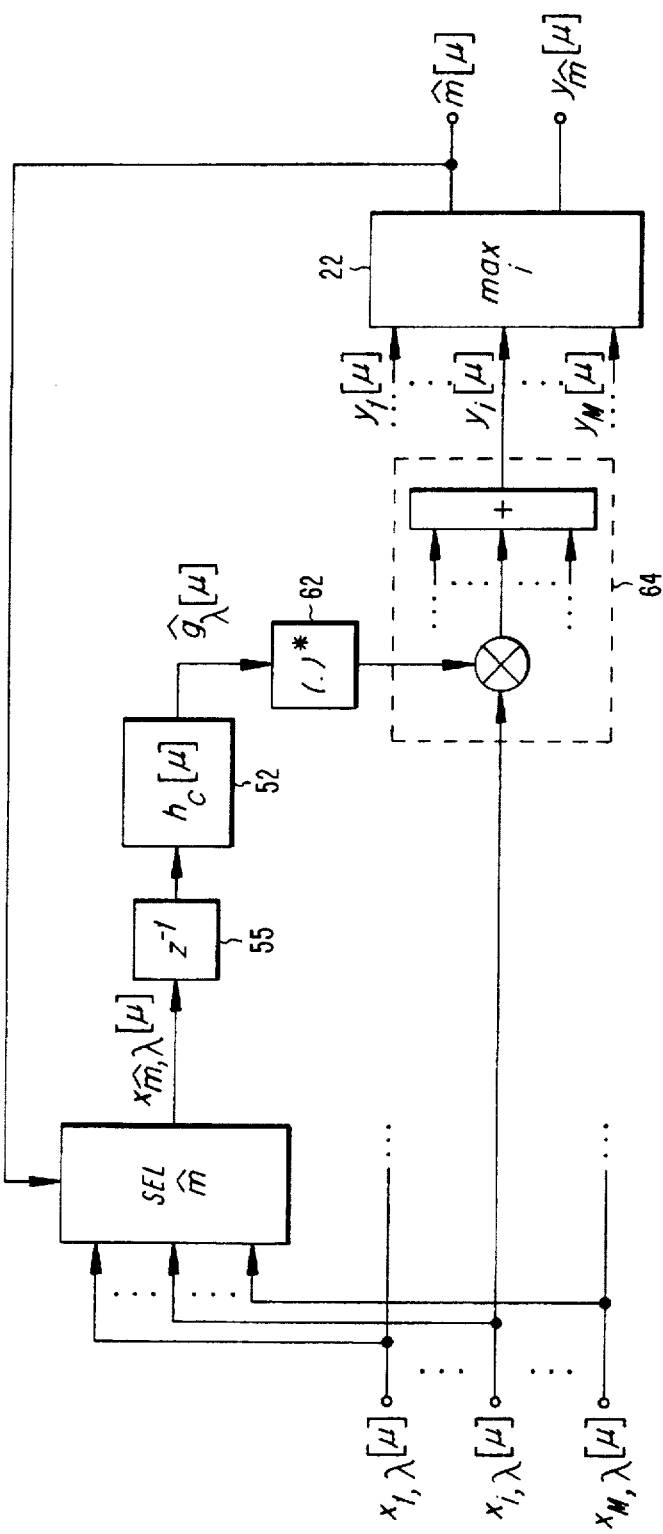
FIG. 7 is a representation of a portion of a receiver employing coherent demodulation with decision-directed channel estimation with feedback.

Another distinction has to be made with respect to the kind of demodulation used in the temporary symbol estimation unit 56. It is possible to use coherent demodulation, e.g., the MRC process when there are a plurality of signal paths, in which case information about the path weights is needed in the temporary symbol estimation unit 56. Such information can be obtained in several ways. As depicted for example in FIG. 7, the MRC combiners 64 are used by the coherent rake receiver's processor 22 to form hard-decided output samples that are used as indexes of temporary symbol estimates that are fed back to the selectors SEL. The correlation samples $x_{\hat{m}',\lambda}[.]$ selected by the selectors SEL are fed into the channel estimation filters 52 in order to generate the estimated path weights $\hat{g}\mu[.]$. In the arrangement of FIG. 7, the channel estimation filters 52 must use exclusively samples $x_{\hat{m}',\lambda}[\mu-v]$ with $v \geq 1$ in the channel estimation procedure in symbol interval $\mu$. Therefore, the channel estimation filters 52 must be prediction filters, and suitable delay elements 55 have to be used. This scheme of DD channel estimation with a prediction filter is described in U.S. Pat. No. 5,305,349, which was incorporated here by reference and described above.

It will be recognized that FIG. 7 shows a portion of a receiver in which the temporary symbol estimates are formed within the data demodulation procedure (which generates the decision variables d[.] (see FIG. 2)) itself, i.e., with feedback of the finally demodulated signal. Such an arrangement for generating the decision variables is not part of Applicants' invention, in which temporary symbol estimates are formed separately from the data demodulation procedure, as indicated for example by FIGS. 5, 6, and 13.

The other possibility is to use noncoherent demodulation in the temporary symbol estimation unit 56. It will be understood that for orthogonal modulation, noncoherent demodulation comprises a combination of an SLC process and forming hard decisions, and for DPSK and similar modulations, noncoherent demodulation in a rake or diversity receiver comprises differential demodulation in each rake finger or signal path and then accumulation. In the case of noncoherent demodulation, information about the path weights is not needed in the temporary symbol estimation unit. Therefore, the channel estimation filters 52 can have arbitrary propagation (group) delay.

It should be remarked that in general a filter does not produce its output signal immediately upon application of its input signal. This elapsed time period is called the filter's propagation delay, the time period necessary for the signal to propagate from the filter's input to the filter's output. For example, one type of finite impulse response (FIR) filter has a constant group delay, i.e., linear phase shift with respect to frequency, but it will be understood that filters having non-linear phase shifts also generally have group delays larger than zero. The amount of group delay of a low-pass filter depends on the filter's cut-off frequency.

On the other hand, other types of FIR filters are prediction filters, which attempt to approximate a group delay of −1. (It will be understood, of course, that it is not possible to obtain a constant group delay of −1.) The standard procedure of designing prediction filters is described in S. Haykin, *Adaptive Filter Theory* 3rd ed., chapts. 5, 6 (1996). It is known from system theory that such filters have higher equivalent noise bandwidth than filters designed to have group delays greater than zero. This fact is one reason for the superiority of a coherent demodulator that uses temporary symbol estimation based on noncoherent demodulation compared to coherent demodulation. This superiority is shown below for two specific implementations by presenting some simulation results.

It will also be understood that in a coherent receiver with temporary symbol estimation that is based on noncoherent demodulation, infinite impulse response (IIR) filters may be used instead of FIR filters. The propagation delay of an IIR filter (equivalent to group delay for frequencies of interest) is approximately equal to the group delay of a corresponding linear-phase FIR filter if both filters are designed according to the same cut-off frequency. On the other hand, it may be impossible to design an IIR filter that is a prediction filter, and thus an IIR filter may not be useable in a coherent receiver with feedback as shown in FIG. 7.

In addition to these two specific schemes for temporary symbol estimation shown in FIGS. 6 and 7, i.e., noncoherent and coherent demodulation, respectively, more complex implementations are possible. For example, the temporary symbol estimation can be performed by an "extra" coherent rake receiver with DD channel estimation, such as the receiver depicted in FIG. 7. Instead of using the output samples $\hat{m}[.]$ for a following channel decoding process (not shown in FIG. 7), the output samples would be fed into the selectors SEL of a following decision-variable-generating means 50, which is equivalent to a second demodulator stage. This second stage 50 would generate the decision variables for subsequent channel decoding. Thus, the components illustrated in FIG. 7 would substitute the temporary symbol estimation unit 56 illustrated in FIG. 5. It will be appreciated that this principle of using more than one stage in the overall demodulation process can be applied in various ways and is called "multistage demodulation" in this application.

Figure 8:
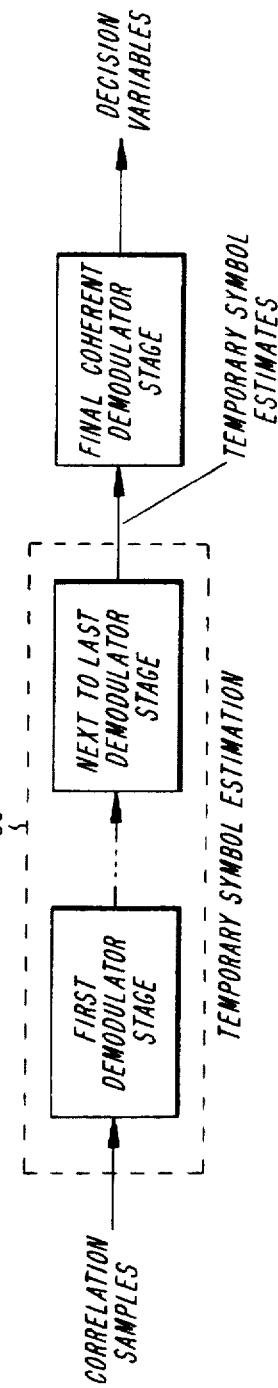
FIG. 8 is a block diagram of a portion of a coherent receiver with multistage demodulation in accordance with Applicants' invention.

A receiver using multistage demodulation is illustrated in FIG. 8. The temporary symbol estimation unit 56 comprises a succession of demodulator stages, only two of which (the first stage and the next to last stage) are explicitly shown. The results produced by one stage are used as temporary symbol estimates by the next successive stage. The results produced by the next to last demodulator stage are temporary symbol estimates that are fed to the final demodulator stage as in the two-stage demodulators described above, for example in connection with FIGS. 5 and 6. In the first demodulator stage, either noncoherent or coherent demodulation can be performed; in the second through the next to last demodulator stages, only demodulation schemes that need channel estimation information make sense. By such multistage demodulation, the reliability of the temporary symbol estimates is improved step by step. Moreover, Applicants' multistage demodulation can be combined with the steps of demodulation, decoding, and re-encoding described above.

In the foregoing description, temporary symbol estimation is based on the maximal correlation samples. It will be appreciated that it is also possible to use others (smaller ones) of the correlation samples as well as the maximal ones at any stage in the temporary symbol estimation process. Plural correlation samples can be used in channel decoding, for example, or by feeding linear combinations of correlation samples for more than one symbol per modulation interval into the channel estimation filters 52. The respective weights (for weighting the plural correlation samples in the linear combining process) may be generated by the temporary symbol estimation unit 56. In this way, the reliability of the temporary symbol estimates may be improved.

For example in FIG. 5, the temporary symbol estimation unit 56 may provide weights respective to several orthogonal symbols, and each selector SEL would comprise a number of complex multipliers and an adder. Each of a respective number of multipliers would form the product of a weight and the respective correlation sample of path $\lambda$. The adder would combine the products from the multipliers according to path $\lambda$, with the sum being provided to a channel estimation filter 52. If samples from all of the M correlators were used, then the selector SEL would be a combination of M correlators and an adder.

It will be understood that Applicants' invention can be used not only in receivers with coherent demodulators (with maximum-ratio combining) for generating the decision variables but also in receivers applying other demodulation schemes. Important examples of such other schemes, for SS communication systems, are equal-gain combining and noncoherent demodulation with power-weighted combining. In general, equal-gain combining is similar to maximum-ratio combining, but only the phase shifts of the path weights are used, not the amplitudes; in power-weighted combining, only the absolute amplitudes, not the phase shifts, are used. Equal-gain combining is described in the literature, e.g., M. Schwartz et al., *Communication Systems and Techniques* (1966), and noncoherent demodulation with power-weighted combining is described in the publication by P. Schramm cited above.

It is currently believed that the most suitable demodulator that results from the foregoing considerations is depicted in FIG. 6. The temporary symbol estimate indexes $\hat{m}'[\mu]$ are generated by noncoherent demodulation: square-law combining the correlation samples, which function is carried out by an SLC processor 58, and forming hard decisions of the combinations based on the decision rule $y'_{\hat{m}}[\mu]=\max_i y'_i[\mu]$, which function is carried out by slicer 60. Each temporary symbol estimate is used by a selector unit SEL for selecting the correlation samples $x_{\hat{m}}, \lambda[\mu]$ that are fed into the respective channel estimation filter 52, which is represented in FIG. 6 by the impulse response $h_c[.]$. The output signal produced by each channel estimation filter 52 is the estimated weight $\hat{g}_\lambda[.]$ of a respective propagation path $\lambda$, the complex conjugate of which is formed by a conjugator 62. The estimated path weight's complex conjugate $\hat{g}_\lambda^*[.]$ is used in the maximum-ratio combining of the coherent demodulation (see the first equation in this Detailed Description), which is carried out by MRC combiners 64. Of course, the delay of $l_c$ symbols due to the channel estimation filters 52 must be taken into account in the demodulation process. Accordingly, delay elements 54, indicated in FIG. 6 by $z^{-l_c}$, are provided for each of the M-ary correlation sample streams $x_{i,\lambda}[\mu]$. The streams of decision variables $y_i[\mu-1_c]$ generated by the MRC combiners 64 are then provided to a metric computation processor 22 as described above.

It will be appreciated that such devices may be implemented as hard-wired logic circuitry or as an integrated digital signal processor, such as an application-specific integrated circuit (ASIC). Of course it will be understood that an ASIC may include hard-wired logic circuitry that is optimal for performing a required function, which is an arrangement commonly selected when speed or another performance parameter is more important than the versatility of a programmable digital signal processor.

In order to estimate the power efficiency of the above-described transmission schemes, computer simulations have been performed. The modulation scheme was that defined in the IS-95 standard and described above with M=64 levels. In contrast to IS-95, a convolutional code having rate ½ and constraint length 8 (generator polynomials 367, 331, 225) was used in the simulations. Furthermore, interleaving was assumed to be perfect. For the case of coherent demodulation with perfect channel estimation and for the case of noncoherent demodulation, the path weights were generated as white, Gaussian processes. For simulating Applicants' coherent demodulation with DD channel estimation, the interleaver size was chosen sufficiently large (252×252 binary symbols) to facilitate nearly perfect interleaving. The metric computation was performed by using the log-likelihood ratio shown in FIG. 4, which was optimum for the channel situation assumed in each simulation. It may be noted that the dual maximum metric described in A. Viterbi, *CDMA* (1996) for use with noncoherent demodulation may be used for demodulation in accordance with Applicants' invention.

Figure 9:
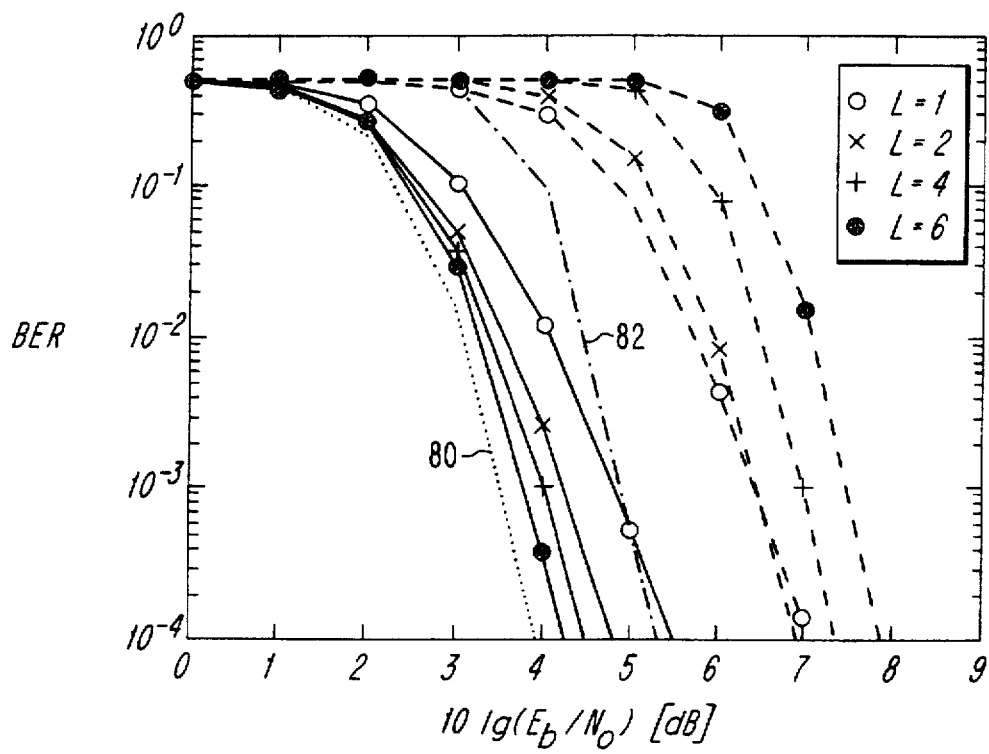
FIG. 9 is a plot of bit error rate with respect to signal power to noise power ratio for two simulated demodulators.

The maximum achievable improvement in BER using coherent instead of noncoherent demodulation was determined by simulations assuming perfect channel estimation. The results are shown in FIG. 9, in which the dashed lines are the results for noncoherent demodulation and the solid lines are the results for coherent demodulation with perfect channel estimation. In FIG. 9 (and in FIG. 10), the equivalent energy per binary information symbol is denoted $E_b$. Results for one, two, four, and six propagation paths are shown. For transmission over a frequency-nonselective Rayleigh fading channel, FIG. 9 indicates that coherent demodulation yields a gain of 1.6 dB or more (depending on the number of propagation paths) at a bit error rate of $10^{-3}$ compared to noncoherent demodulation.

For coherent demodulation, increasing multipath diversity leads to increasing power efficiency until, in the limit of an infinitely large number of propagation paths, the performance of transmission over a time-invariant non-dispersive AWGN channel (indicated in FIG. 9 by the dotted line 80) is achieved. In contrast, noncoherent demodulation yields a combining loss when there is multipath diversity. For comparison, the BER of noncoherent demodulation for transmission through a time-invariant, non-dispersive AWGN channel is indicated by the dashed-dotted line 82. In the case of multipath propagation and powerful channel coding as applied here, this combining loss leads to a significant reduction in power efficiency when there are more than two propagation paths in the channel. Therefore, the advantage of coherent demodulation increases with growing multipath diversity. This same behavior occurs for other kinds of diversity as well, such as antenna diversity. This fact is an important advantage of coherent demodulation in modern mobile radio systems.

Figure 10:
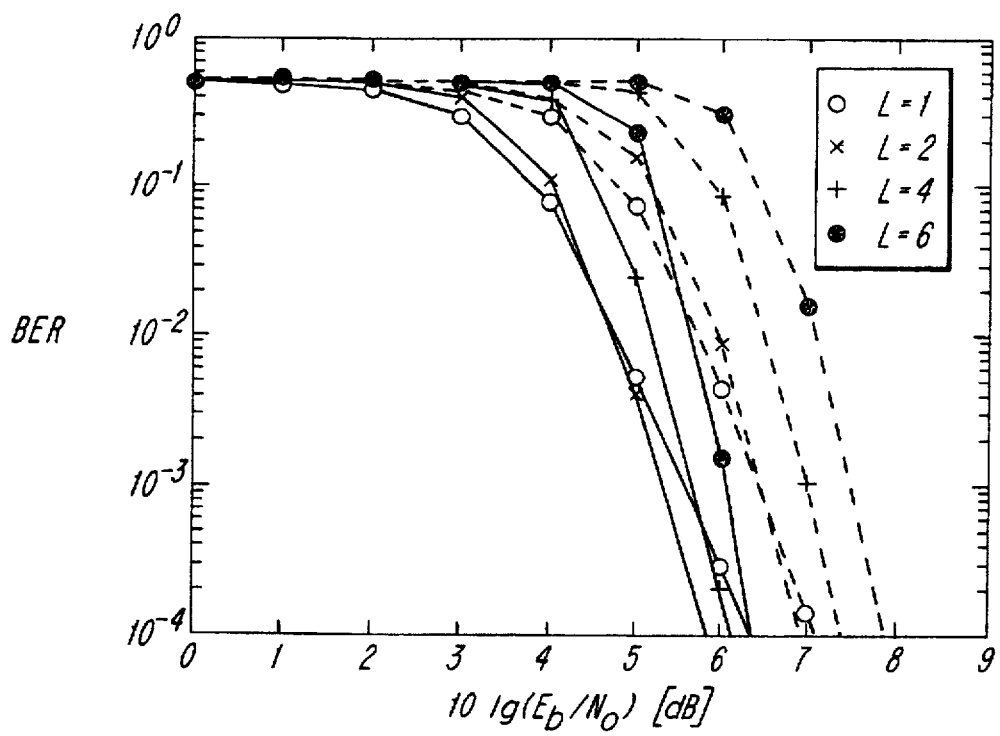
FIG. 10 is a plot of bit error rate with respect to signal power to noise power ratio for a simulated coherent receiver with both perfect channel estimation and decision-directed channel estimation in accordance with Applicants' invention.

The performance of Applicants' receiver employing a combination of coherent demodulation and DD channel estimation was simulated for a maximum Doppler frequency $0.024/T_b$. The results for the embodiment illustrated in FIG. 6 are depicted in FIG. 10, in which the dashed lines are the results for noncoherent demodulation (same as FIG. 9) and the solid lines are the results for coherent demodulation with DD channel estimation and temporary symbol estimation based on noncoherent demodulation. Results for one, two, four, and six propagation paths are shown. In order to focus on any loss attributable to estimating the path weights, the estimation of the delays in the channel was assumed to be perfect. The channel estimation filters 52 were FIR filters having linear phase and degree 20 that were designed for a desired rectangular frequency response by using the minimum mean-squared error (MMSE) criterion described in the text by S. Haykin cited above. It will be understood from the foregoing that using FIR filters having more than 21 taps (degree 20) or using IIR filters, both of which may have a lower equivalent noise bandwidth, could yield even better system performance.

Comparing the simulation results in FIG. 10 to the results in FIG. 9 shows that the degradation due to using DD channel estimation compared to perfect channel estimation is only 0.8 dB at a bit error rate of $10^{-3}$ for one propagation path, increasing up to 2.3 dB for six propagation paths. The results in FIG. 10 show the gain of coherent demodulation with DD channel estimation compared to noncoherent demodulation as 0.8 dB at a BER of $10^{-3}$ for one propagation path and 1.4 dB for six propagation paths.

Above, it is stated that the receiver employing DD channel estimation with noncoherent demodulation depicted in FIG. 6 significantly out-performs the receiver employing DD channel estimation with coherent demodulation suggested by FIG. 7. This was demonstrated by quantitative examples derived from computer simulations of the receiver shown in FIG. 7. The simulation parameters were the same as for FIG. 10. For a fair comparison of the schemes, the filter degree was chosen equal to 20 in all cases. In the scheme of FIG. 7, the filters are prediction filters, which were designed according to the chapter 6 of the text by S. Haykin cited above. The simulation results are depicted in FIGS. 11 and 12 for transmission through channels with one and four propagation paths, respectively.

In both scenarios, the BER performance of the scheme of FIG. 7 is worse than the BER performance of a receiver employing noncoherent demodulation. Only the scheme of FIG. 6 had a significant gain as a result of coherent demodulation. It should be noted that the performance of the systems strongly depends on the maximum Doppler frequency and the channel filter's cut-off frequency, which is adjusted according to the maximum Doppler frequency. If the maximum Doppler frequency is low, the disadvantage of the scheme of FIG. 7 shown in FIGS. 11 and 12 may be less significant. For a mobile application such as a communication system according to IS-95, however, the scenario used for the simulations is believed to be reasonable.

The scheme of FIG. 6 is superior compared to the one of FIG. 7 at least because the noise bandwidth of the channel estimation filter 52 is significantly lower, especially if the maximum Doppler frequency is high. (This fact has already been discussed.) Another possible reason is that, in the scheme of FIG. 6, the preliminarily decided symbols used for DD channel estimation are generated independent from data estimation, and thus error propagation is avoided. Concrete reasons for the better performance are hard to give because of the nonlinearity of the systems. The scheme of FIG. 6 can be viewed as a two-stage demodulator because there is no feedback of the fully demodulated signal. From other systems (e.g., a CDMA system employing joint detection), it is known that performance could be improved by two-stage demodulators.

The comparison of BERs for both schemes shows that coherent demodulation outperforms noncoherent demodulation, and the complexity of the receiver is increased only marginally. This is true especially for the coherent demodulator with DD channel estimation based on temporary symbol estimation with noncoherent demodulation depicted in FIG. 6. For a maximum Doppler frequency of $0.024/T_b$, which is typical for mobile radio applications, the achievable gain is about 1 dB. It will be understood that the power efficiency of Applicants' system depends on the maximum Doppler frequency, which is given by the channel characteristics. If the maximum Doppler is low a priori, as it would be in an application such as a wireless local loop, the gain achievable by using Applicants' coherent instead of noncoherent demodulation will be greater than about 1 dB because the equivalent noise bandwidth of the channel estimation filter 52 can be reduced. Therefore, Applicants' receiver is very attractive for applications like wireless local loops and wireless local area networks.

Applicants' invention provides increased power efficiency for digital communication systems using orthogonal modulation. In CDMA systems, the improved performance leads to an increased spectral efficiency (user capacity). Another important advantage is that receivers using Applicants' demodulation scheme are compatible with systems designed for noncoherent demodulation.

One important application of Applicants' combination of coherent demodulation with DD channel estimation is the uplink of an IS-95 communication system. In such a mobile radio environment, Applicants' combination provides a gain of about 1 dB over noncoherent systems. For other environments, such as a wireless local loop, the gain from Applicants' scheme should be even higher.

Applicants' invention is described above in the context of orthogonal modulation schemes, which is equivalent to a context of orthogonal (e.g., Walsh-Hadamard) sequences. It is currently believed that Applicants' temporary symbol estimation works best in this context. Nevertheless, Applicants' temporary symbol estimation may also be applied in a context of bi-orthogonal and non-orthogonal sequences, such as that described in U.S. Pat. No. 5,237,586 that was incorporated here by reference above.

In order to illustrate the use of Applicants' invention for non-SS communication systems, FIG. 13 shows a portion 50'of a receiver for pulse amplitude modulation (PAM), quadrature amplitude modulation (QAM), or PSK or DPSK modulation that makes use of diversity. The arrangement depicted in FIG. 13 is similar to the arrangement depicted in FIG. 5, which is modified in a straightforward way. It will be understood that the principle of Applicants' temporary symbol estimation operates substantially identically in both, although matched filtering and sampling in the non-SS system replace the correlators in the SS system. In addition, it will be understood that FIG. 13 represents only one signal or propagation path and that a multipath or diversity receiver would typically include plural selectors SEL', channel estimation filters 52', delay elements 54', conjugators 62', and combiners 64'.

In the typical non-SS receiver, demodulation is performed by matched filtering and sampling the signals received for each path of the diversity receiver. Devices for performing these functions are not shown in FIG. 13. The resulting complex-valued samples are all fed into a temporary symbol estimation unit 56', which generates inverses of temporary amplitude coefficient estimates. These estimates are estimates of the amplitude coefficients corresponding to the particular modulation scheme (e.g., PAM, QAM, PSK, or DPSK) that are fed into the pulse-shaping filter present in the transmitter. Since the temporary amplitude coefficient estimates are multi-level signals (which is in contrast to an orthogonal modulation scheme in which only zeroes and ones occur), the selector SEL' shown in FIG. 13 is a complex multiplier or equivalent device. This correspondence shows that all operations described above for SS modulation can be applied for non-SS digital communication systems. Furthermore, the modulation scheme may be bi-orthogonal or non-orthogonal. In this context, Applicants' invention currently appears to be most attractive for communication systems based on DPSK because the temporary symbol estimation can be performed by noncoherent demodulation.

It will be understood that the arrangement depicted in FIG. 13 can also be used in a non-diversity communication system simply by observing that exclusively the samples from the only matched filter in such a system are fed into the temporary symbol estimation unit 56', which would estimate for each such sample which amplitude coefficient (e.g., 1+j; 3+3j; etc.) was probably sent and would provide that estimate to the selector SEL'. Then, the selector SEL' would comprise a complex multiplier, which would form the products of the inverses of the estimates and their respective samples, and these products would be provided to a channel estimation filter 52'. An estimated path weight generated by the filter 52' would be provided to a conjugator 62', and the conjugated path weight estimate would be provided to a combiner 64', also comprising a complex multiplier.

It will be understood by those of ordinary skill in the art that this invention can be embodied in other forms without departing from its essential nature. Therefore, the embodiments described above will be considered in all respects as illustrative and not restrictive. The scope of this invention is defined by the following claims.

What is claimed is:

1. An apparatus in a receiver employing coherent demodulation and decision-directed channel estimation for a communication system in which a transmitter sends an information signal to the receiver and the receiver generates samples of a received signal that are correlated against a predetermined code sequence to produce correlation samples, the apparatus comprising:

means for estimating path weights based on correlation samples, wherein the estimating means comprises:
means for generating temporary symbol estimates based on correlation samples, wherein the temporary symbol estimates are generated separately from a data demodulation procedure employed by the receiver, without feedback of the information signal determined by the data demodulation procedure,
means for selecting correlation samples based on temporary symbol estimates, and
channel estimation means for generating path weights based on selected correlation samples; and
means for generating decision variables in the data demodulation procedure employed by the receiver for determining the information signal, wherein the decision variables are generated by maximum-ratio combinations of correlation samples based on estimated path weights.

2. The apparatus of claim 1, wherein the temporary symbol estimate generating means comprises means for noncoherently demodulating received signal samples based on correlation samples and means for forming hard decisions of noncoherently demodulated received signal samples as temporary symbol estimates.

3. The apparatus of claim 1, wherein the temporary symbol estimate generating means comprises means for demodulating received signal samples, means for decoding demodulated signal samples and forming estimates of the information signal, and means for re-encoding estimates of the information signal and forming temporary symbol estimates based in re-encoded estimates.

4. The apparatus of claim 1, wherein the temporary symbol estimate generating means generates weights for linear combinations of correlation samples, and the channel estimation means generates estimated path weights based on the linear combinations.

5. The apparatus of claim 1, wherein the temporary symbol estimate generating means comprises means for coherently demodulating the received signal and means for forming hard decisions of the coherently demodulated received signal as temporary symbol estimates.

6. The apparatus of claim 1, wherein the temporary symbol estimate generating means comprises means for demodulating the received signal in at least two stages and means for forming hard decisions of the demodulated received signal as temporary symbol estimates.

7. A method in a receiver employing coherent demodulation and decision-directed channel estimation for a communication system in which a transmitter sends an information signal to the receiver and the receiver generates samples of a received signal that are correlated against a predetermined code sequence to produce correlation samples, the method comprising the steps of:
estimating path weights based on correlation samples, wherein the estimating step comprises the steps of:
generating temporary symbol estimates based on correlation samples, wherein the temporary symbol estimates are generated separately from a data demodulation procedure employed by the receiver, without feedback of the information signal determined by the data demodulation procedure,
selecting correlation samples based on temporary symbol estimates, and
generating path weights based on selected correlation samples; and
generating decision variables in the data demodulation procedure employed by the receiver for determining the information signal, wherein the decision variables are generated by maximum-ratio combinations of correlation samples based on estimated path weights.

8. The method of claim 7, wherein the temporary symbol estimate generating step comprises the steps of noncoherently demodulating received signal samples based on correlation samples and forming hard decisions of noncoherently demodulated received signal samples as temporary symbol estimates.

9. The method of claim 7, wherein the temporary symbol estimate generating step comprises the steps of demodulating received signal samples, decoding demodulated signal samples and forming estimates of the information signal, and re-encoding estimates of the information signal and forming temporary symbol estimates based on re-encoded estimates.

10. The method of claim 7, wherein the temporary symbol estimate generating step produces weights for linearly combining correlation samples, and estimated path weights are based on linearly combined correlation samples.

11. The method of claim 7, wherein the temporary symbol estimate generating step comprises the steps of coherently demodulating received signal samples and forming hard decisions of coherently demodulated received signal samples as temporary symbol estimates.

12. The method of claim 7, wherein the temporary symbol estimate generating step comprises the steps of demodulating received signal samples in at least two stages and forming hard decisions of demodulated received signal samples as temporary symbol estimates.

13. An apparatus in a receiver employing coherent demodulation and decision-directed channel estimation for a communication system in which a transmitter sends an information signal to the receiver and the receiver generates samples of a received signal after matched filtering, the apparatus comprising:
means for estimating path weights based on received signal samples, wherein the estimating means comprises:
means for generating temporary symbol estimates based on received signal samples, wherein temporary symbol estimates are generated separately from a data demodulation procedure employed by the receiver, without feedback of the information signal determined by the data demodulation procedure,
means for forming products of inverses of temporary symbol estimates and received signal samples; and
channel estimation means for generating path weights based on selected received signal samples; and
means for generating decision variables for the data demodulation procedure employed by the receiver for determining the information signal, wherein decision variables are generated by maximum-ratio combinations of received signal samples based on estimated path weights.

14. The apparatus of claim 13, wherein the temporary symbol estimate generating means comprises means for noncoherently demodulating received signal samples based on correlation samples and means for forming hard decisions of noncoherently demodulated received signal samples as temporary symbol estimates.

15. The apparatus of claim 13, wherein the temporary symbol estimate generating means comprises means for demodulating received signal samples, means for decoding demodulated received signal samples and forming estimates of the information signal, and means for re-encoding estimates of the information signal and forming temporary symbol estimates based on re-encoded estimates.

16. The apparatus of claim 13, wherein temporary symbol estimate generating means generates weights for linear combinations of correlation samples, and the channel estimation means generates estimated path weights based on such linear combinations.

17. A method in a receiver employing coherent demodulation and decision-directed channel estimation for a communication system in which a transmitter sends an information signal to the receiver and the receiver generates samples of a received signal after matched filtering, the method comprising the steps of:
estimating path weights based on received signal samples, wherein the estimating step comprises the steps of:
generating temporary symbol estimates based on received signal samples, wherein temporary symbol estimates are generated separately from a data demodulation procedure employed by the receiver, without feedback of the information signal determined by the data demodulation procedure,
forming products of inverses of temporary symbol estimates and received signal samples, and generating path weights based on selected received signal samples; and generating decision variables for the data demodulation procedure employed by the receiver for determining the information signal, wherein decision variables are generated by maximum-ratio combinations of received signal samples based on estimated path weights.

18. The method of claim 17, wherein the temporary symbol estimate generating step comprises noncoherently demodulating received signal samples based on correlation samples and forming hard decisions of noncoherently demodulated received signal samples as temporary symbol estimates.

19. The method of claim 17, wherein the temporary symbol estimate generating step comprises demodulating received signal samples, decoding demodulated received signal samples and forming estimates of the information signal, and re-encoding estimates of the information signal and forming temporary symbol estimates based on re-encoded estimates.

20. The method of claim 17, wherein the temporary symbol estimate generating step generates weights for linear combinations of correlation samples, and estimated path weights are generated based on such linear combinations.

21. A receiver for a spread spectrum communication system in which a transmitter sends an information signal to the receiver and the receiver generates samples of a received signal, comprising:

means for producing samples of at least two rays of the received signal;

means for correlating groups of samples against a predetermined code sequence to produce a plurality of correlation samples;

means for estimating a respective path weight for each ray based on correlation samples, wherein the estimating means comprises means for generating temporary symbol estimates based on correlation samples and separate from a data demodulation procedure employed by the receiver without feedback of the information signal determined by the data demodulation procedure, means for selecting correlation samples based on temporary symbol estimates, and channel estimation means for generating path weights based on selected correlation samples; and means for generating decision variables in the data demodulation procedure employed by the receiver for determining the information signal, wherein decision variables are generated by maximum-ratio combinations of correlation samples based on estimated path weights.

22. The receiver of claim 21, wherein the temporary symbol estimate generating means comprises means for square-law combining correlation samples and means for forming hard decisions of square-law-combined correlation samples.

23. The receiver of claim 22, wherein the temporary symbol estimate generating means further comprises delay elements for correlation samples.

24. The receiver of claim 21, wherein the temporary symbol estimate generating means further comprises delay elements for correlation samples.

25. A method of demodulating an information signal in a spread spectrum communication system in which a receiver generates samples of a received information signal, comprising the steps of:

producing samples of at least two rays of the received information signal;

correlating groups of the samples against a predetermined code sequence to produce a plurality of correlation samples;

estimating a respective path weight for each ray based on correlation samples, wherein the estimating step comprises the steps of generating temporary symbol estimates based on correlation samples and separately from a data demodulation procedure employed by the receiver without feedback of the information signal determined by the data demodulation procedure, selecting correlation samples based on temporary symbol estimates, and generating path weights by filtering selected temporary symbol estimates; and generating decision variables in the data demodulation procedure employed by the receiver for determining the information signal, wherein decision variables are generated by maximum-ratio combining correlation samples selected according to estimated path weights.

26. The method of claim 25, wherein the step of generating temporary symbol estimates comprises the steps of square-law combining correlation samples and forming hard decisions of square-law-combined correlation samples.

27. The method of claim 26, wherein the step of generating temporary symbol estimates further comprises the step of delaying correlation samples.

28. The method of claim 25, wherein the step of generating temporary symbol estimates further comprises the step of delaying correlation samples.

* * * * *